United States Patent Office 3,485,881
Patented Dec. 23, 1969

3,485,881
DIMERIZATION OF OLEFINS
Ernest A. Zuech, Bartlesville, Okla., assignor to Phillips Petroleum Company, a corporation of Delaware
No Drawing. Continuation-in-part of application Ser. No. 598,975, Dec. 5, 1966. This application Oct. 9, 1967, Ser. No. 674,004
Int. Cl. C07c 3/00
U.S. Cl. 260—666                9 Claims

ABSTRACT OF THE DISCLOSURE

Monoolefin is dimerized with a catalyst formed from (1) an organoaluminum halide component and (2) a complex of nickel halide with one of trihydrocarbyl phosphine, trihydrocarbyl phosphine oxide, trihydrocarbyl arsine oxide, pyridine, bipyridine, and phenanthroline substituted pyridine, bipyridine, and phenantholine and a complex of a nitrogen bridgehead bicyclic compound with nickel halide.

This application is a continuation-in-part of copending application Ser. No. 598,975, filed Dec. 5, 1966, now abandoned.

This invention relates to the dimerization of olefins. In one aspect, this invention relates to novel catalysts for the dimerization of olefins.

Various processes have been developed for the dimerization of olefins. However, many problems have been encountered in providing a catalyst having a sufficiently high selectivity for the production of dimers such that unnecessarily high and wasteful quantities of undesirable higher molecular weight polymerization products are not obtained.

An object of the invention is to provide new catalysts for the production of olefin dimers.

Another object of the invention is to provide a process for the dimerization of cyclic and acyclic monoolefins.

Other objects, advantages, and features of the invention will be apparent to those skilled in the art from the following description and the appended claims.

According to the process of the invention, I have found that $C_2$ to $C_{12}$ cyclic and acyclic monoolefins can be dimerized and/or codimerized by contacting the monoolefins with a catalyst formed by the admixture of a first component selected from the group consisting of those represented by the formulae $(R_3P)_2NiY_2$, $(R_3PO)_2NiX_2$, $(R_3AsO)_2NiX_2$, (pyridine)$_2NiX_2$, (bypyridine)$NiX_2$, (phenanthroline)$NiX_2$, and a complex of a nitrogen bridgehead bicyclic compound with $NiX_2$, where R is a hydrocarbon radical having up to about 20 carbon atoms, e.g. 1 to 20 carbon atoms, X is a halogen, Y is selected from the group consisting of a halogen and a hydrocarbon radical as defined above, and the pyridine, bypyridine, and phenanthroline are hydrocarbon substituted or unsubstituted, and a second compound represented by the formula $R'_xAlX_y$ where $x$ and $y$ are integers of at least 1 whose total is 3, R' is a hydrocarbon radical having up to about 20 carbon atoms, e.g. 1 to 20 carbon atoms, and X is a halogen. Further according to my invention, I have found a dimerization catalyst formed by the admixture of the first and second components disclosed above which has a high selectivity for the formation of dimers.

The olefins to which the present dimerization process is directed include cyclic monoolefins having up to about 12 carbon atoms per molecule and acyclic monoolefins having from about 2 to 12 carbon atoms, inclusive, where the acyclic monoolefin can be a terminal or an internal olefin, branched or unbranched, but has no branching nearer than the 3-position to the double bond. Examples of suitable monoolefins which can be used according to the present invention are ethylene, propylene, butene-1, butene-2, pentene-1, pentene-2, cyclopentene, cyclohexene, 3,4,5-trimethylcyclohexene, 3-methylbutene-1, cycloheptene, hexene-2, heptene-1, cyclooctene, 4,4-dimethylheptene-2, decene-1, dodecene-1, and the like and mixtures thereof.

The catalyst of the present invention is formed by the admixing of two components, the first component containing nickel and the second component containing aluminum. The first component of the catalyst system can be represented by the formulae $(R_3P)_2NiY_2$, $(R_3PO)_2NiX_2$, $(R_3AsO)_2NiX_2$,

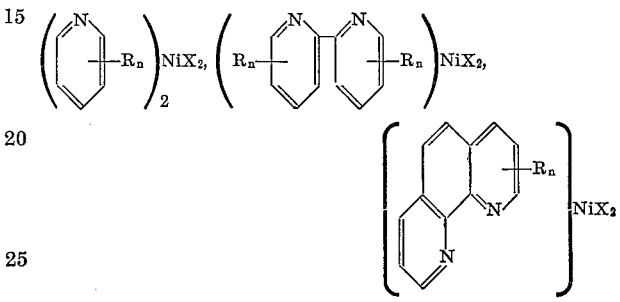

and a complex of one of

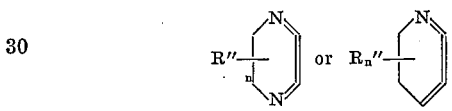

with $NiX_2$ which can be represented in the case where the ntrogen bridgehead bicyclic compound is triethylenediamine (TED) as $(TED)_3Ni_2X_4$, wherein R is an alkyl, alkenyl, aryl, cycloalkyl radical, or combinations thereof, such as aralkyl or alkaryl, having up to about 20 carbon atoms per radical, preferably 1 to 10 carbon atoms per radical, Y is a halogen, such as chlorine, bromine, and iodine, or a radical R as defined above, X is a halogen such as chlorine, bromine, and iodine, $n$ is an integer of 0 to 4, and R" is one of methyl, and ethyl.

Some examples of suitable nickel halide complexes which can be used as the first component of the catalyst system are:

bis(triphenylphosphine)dichloronickel,
bis(tributylphosphine)dibromonickel,
bis(tricyclopentylphosphine)diiodonickel,
bis(tribenzylphosphine)dichloronickel,
bis[tri(4-tolyl)phosphine]dibromonickel,
bis(triisobutylphosphine)allylnickel chloride,
bis(trimethylphosphine)methylnickel bromide,
bis[tri(2-naphthyl)phosphine]benzylnickel iodide,
bis[tri(2-ethylhexyl)phosphine]phenylnickel chloride,
bis(tricrotylphosphine)cyclohexylnickel bromide,
bis(trieicosylphosphine)dichloronickel, and the like and mixtures thereof. In the above-mentioned specific phosphine compounds the term "phosphine" can be deleted and any one of the terms "phosphine oxide," and "arsine oxide" can be substituted therefor to obtain other suitable specific compounds for this invention. For example, bis(triphenylphosphine)dichloronickel can also be bis(triphenylphosphine oxide)dichloronickel, or bis(triphenylarsine oxide)dichloronickel, and so on with the other specific compounds mentioned. Therefore, for the sake of brevity, additional specific compounds containing phosphorus or arsenic will not be listed here. Other suitable specific compounds include bis(pyridine)dichloronickel, (bipyridine)dibromonickel, (phenanthroline)diiodonickel, and a complex of triethylenediamine and nickel dihalide which, in the case of the chlorine species, can be termed tris(triethylenediamine)tetrachlorodinickel.

The bis(trihydrocarbylphosphine)dihalonickel compounds are known in the art and can be prepared by any conventional technique, generally by combining a nickel dihalide with a trihydrocarbyl phosphine in a suitable solvent. To prepare the hydrocarbon-substituted variation of the above catalyst, one mole of the above dihalonickel complex is treated with 1 or 2 moles of a hydrocarbylmagnesium halide or its equivalent in a hydrocarbylalkali metal compound, a hydrocarbylalkaline earth metal compound, or a hydrocarbylaluminum compound. The contact can take place at $-30$ to about $100°$ C. for a period of from a few minutes to several hours in any convenient solvent in which the reagents are at least partially soluble, ethers being preferred. The solid can be isolated by conventional crystallization techniques or can be utilized after simple evaporation of the ether.

The phosphine oxide and arsine oxide compounds are also known in the art and can be prepared in accordance with the process disclosed by Cotton and Goodgame in The Journal of the American Chemical Society, vol. 82, page 5771, 1960.

The pyridine, bipyridine, phenanthroline, and nitrogen bridgehead bicyclic compound complexes can all be prepared by mixing the nitrogen halide compound $NiX_2$ and the pyridine, bipyridine, phenanthroline, or bicyclic compound in absolute ethanol at room temperature. Generally, a 2:1 mole ratio of pyridine to the nitrogen halide compound can be employed whereas with the bipyridine, phenanthroline, and bicyclic compounds a 1:1 mol ratio of those compounds to nickel halide compound can be used. From the mixing of these compounds in absolute ethanol at room temperature, a solid product is obtained which can readily be separated by filtration and drying in a conventional manner.

The second component of the catalyst system can be represented by the formula $R'_xAlX_y$ where $x$ and $y$ are integers of at least 1 whose total is 3, $R'$ is as defined above, $R'$ in this component contains preferably 1 to 5 carbon atoms per radical but can also contain 1 to 20 or 1 to 10 carbon atoms per radical, and X is a halogen such as chlorine, bromine, and iodine.

Some examples of the second catalyst component, the aluminum-containing compound, are: methylaluminum dichloride, dimethylaluminum chloride, diethylaluminum bromide, ethylaluminum dibromide, vinylaluminum diiodide, dibutylaluminum chloride, phenylaluminum dibromide, dibenzylaluminum chloride, 4-tolylaluminum dichloride, dodecylaluminum dibromide, eicosylaluminum dichloride, butylaluminum dichloride, and mixtures thereof including methylaluminum sesquichloride, ethylaluminum sesquichloride, and the like. Presently preferred aluminum compounds are those containing radicals of the lower hydrocarbons, such as methyl and ethyl.

The above-described first and second components of the catalyst are generally combined in proportions in the range from about 0.5:1 to 20:1 moles of aluminum in the second component per mole of nickel in the first component. It has been found desirable to employ the upper portion of the before-mentioned range when it is desirable to scavenge catalyst poisons from the system.

The catalyst of the present invention is prepared by combining the first and second components of the catalyst under conditions of time and temperature which permit the active catalyst to be formed. The two components of the catalyst can be mixed at any convenient temperature within the range of about $-80$ to about $100°$ C. for a period of time ranging from a few seconds up to several hours in the presence of a diluent in which both of the two components are at least partially soluble. Examples of suitable solvents or diluents are benzene, chlorobenzene, methylene chloride, ethylene chloride, and the like. However, halogenated diluents are preferred. It has further been found that when the first component of the catalyst contains two halogen atoms the preferred diluent is an aryl halide whereas when the first component of the catalyst contains one or less halide atoms both aryl and alkyl halide diluents can be employed. The forming of the catalyst by admixing the two components is generally carried out in an inert atmosphere and in the substantial absence of air or moisture. After the catalyst is formed, it need not be isolated but can be added directly to the reaction zone as a solution or suspension in its preparation medium. If desired, the first and second components used to form the catalyst can be separately added, in any order, to the reaction zone either in the presence or absence of the feed olefin.

The unexpected dimerization activity of the catalysts so formed containing nickel is illustrated by the poor results obtained when either iron or cobalt, the other members of the nickel triad of Group VIII, are substituted for nickel. A corresponding copper catalyst gave little evidence of reaction.

The dimerization of the olefin or mixture of olefins can take place at temperatures within the range of $-80$ to about $100°$ C., and preferably within the range of $-20$ to about $50°$ C. The optimum temperature range for the dimerization of ethylene is $-50$ to about $25°$ C. Normally, it is desirable to carry out the dimerization reaction under pressures ranging up to about 2000 p.s.i.g., and preferably 20–500 p.s.i.g. The dimerization can be carried out in presence of a diluent such as that used for the catalyst preparation if desired. The time of contact of the olefin with the catalyst for the dimerization of the olefin will vary depending upon the desired degree of conversion but, generally will be within the range from about 0.1 minute to about 20 hours, preferably 5 to 120 minutes. The proportion of catalyst composition of olefin feed in the reaction zone will generally be within the range of about 0.001 to about 0.1 mole of nickel complex per mole of olefin feed.

Any conventional contacting technique can be utilized for the olefin dimerization and batchwise or continuous operations can be utilized. After the desired degree of conversion of the olefin to the dimer, the products so formed can be separated and isolated by conventional means such as by fractionation, crystallization, adsorption, and the like. The unconverted feed material can be recycled to the reaction zone. If desired, the catalyst can be destroyed by treatment with suitable deactivating agents such as water or alcohol, prior to the separation of the products. In some cases, a catalyst-solvent phase will settle out from a crude reaction mixture, allowing the product to be separated by decantation. The separated catalyst phase, preferably fortified with additional aluminum component, can then be frequently reused.

The dimerization of olefins, and the dimers so produced, can be used for many purposes well known in the art. For example, propylene dimers can be cracked by conventional methods to make isoprene. Also, propylene dimers, as well as dimers of other olefins, can be employed as feed stock for the oxo-process to make oxo-alcohols which are used in the preparation of plasticizers.

The invention can be further illustrated by the following examples:

EXAMPLE I $0°$ C. conversion of propylene over bis(triphenylphosphine)dichloronickel and ethylaluminum dichloride (EADC)

A catalyst for the dimerization of propylene was prepared by introducing a suspension of 0.65 g. of bis(triphenylphosphine)dichloronickel in 5 ml. of chlorobenzene into a 7 ounce reaction bottle, cooling the bis(triphenylphosphine)dichloronickel solution in an ice bath under a nitrogen atmosphere, and admixing 1 ml.

of ethylaluminum dichloride with the suspension of bis-(triphenylphosphine)dichloride. The bottle was then evacuated, connected with a source of propylene at 25 p.s.i.g., and maintained in a bath at 0–5° C. In a 2 hour period, 130 g. of propylene was absorbed and the reaction mixture separated into a clear, supernatant phase and a heavy dark catalyst-containing phase. The product-containing supernatant phase was removed and to the lower phase was added an additional 5 ml. of chlorobenzene and 0.2 ml. of additional ethylaluminum dichloride. Propylene was again passed into the reaction bottle at 25 p.s.i.g. and at 0–5° C. In a 2 hour period, about 113 g. of propylene was absorbed.

This reaction mixture and the previous supernatant phase were combined, hydrolyzed by the addition of water, and the organic phase was separated yielding about 238.7 g. of crude product. Gas-liquid chromatography showed that the crude product contained about 205 g. (86 percent) of three propylene dimers.

To further identify the structure of the dimers, a sample was hydrogenated over PtO in acetic acid. The gas-liquid chromatographic analysis of the hydrogenated sample showed the presence of 13.2 percent of 2,3-dimethyl butane, 72.0 percent of 2-methylpentane, and 14.8 percent of n-hexane.

EXAMPLE II

0° C. conversion of propylene over bis(tributylphosphine)dichloronickel and EADC Using the same general technique as that of Example I, a solution of bis(tributylphosphine)dichloronickel (0.46 g.) of 5 ml. of chlorobenzene was cooled in an ice bath, admixed with 1 ml. of ethylaluminum dichloride, and contacted with a propylene supply at 25 p.s.i.g. while being maintained in an ice bath at 0–5° C. In a 2 hour period, about 108 g. of propylene was absorbed. Analysis showed the presence of 86 g. (80 percent) of propylene dimers.

To further identify the dimers, a sample was hydrogenated and analyzed revealing the presence of 25.0 percent of 2,3-dimethylbutane, 65.7 percent of 2-methylpentane, and 9.3 percent of n-hexane. A trace of 3-methylpentane could also be detected.

EXAMPLE III

0° C. conversion of butene-1 over bis(triphenylphosphine)dichloronickel and EADC Using the same general technique as that of Example I, a catalyst formed by the admixture of 0.65 g. of bis-(triphenylphosphine)dichloronickel, 5 ml. chlorbenzene, and 1 ml of ethylaluminum dichloride was contacted with butene-1 at 11–14 p.s.i.g. and 0–5° C. After a 2 hour reaction period and hydrolysis of the reaction mixture by the addition of water, the separated organic phase showed that a total of 77 g. of butene-1 had been absorbed. Analysis of this product showed the presence of 68 g. of dimers (88 percent).

To further identify the products, a sample was hydrogenated and analysis showed the presence of 17.6 percent of 3,4-dimethylhexane, 73.4 percent of 3-methylheptane, 9.0 percent of n-octane.

EXAMPLE IV

Conversion of pentene-1

Using the same general technique as that of Example I, a suspension of 0.65 g. of bis(triphenylphosphine)dichloronickel in 5 ml. of chlorobenzene at room temperature was admixed with 1 ml. of ethylaluminum dichloride. In a room temperature reaction, 50 ml. (32 g.) of pentene-1 was added to the reaction bottle in increments at approximately 10 minute intervals, after which the reaction mixture was stirred for 2 hours at room temperature. After hydrolysis, the analysis of the separated organic phase showed the presence of 30.2 g. (94 percent) of $C_{10}$ olefins in 6 isomeric forms. The remaining pentene-1 had been converted to trans-pentene-2, with possibly a trace of the cis-2-pentene.

EXAMPLE V

Conversion of pentene-2

Using the general technique as that of Example I, a catalyst formed by the admixture of 0.65 g. of bis(triphenylphosphine)dichloronickel, 5 ml. of chlorobenzene, and 1 ml. of ethylaluminum dichloride was contacted with 50 ml. (32 g.) of pentene-2 added in 10 ml. increments at 10 minute intervals. The mixture was then stirred for 2 hours at 0–5° C. It was then washed with water and the separated organic phase showed the presence of 11.8 g. (37 percent) of $C_{10}$ olefins.

In another run in which the above test was repeated except that the reaction was carried out at room temperature, analysis showed the presence of 9.9 g. (31 percent) of $C_{10}$ olefins with the distribution of isomers essentially identical to that of the above test.

EXAMPLE VI

Conversion of propylene/pentene-1 mixture

Using the same general technique as that of Example I, a suspension of 0.65 g. of bis(triphenylphosphine)dichloronickel in 5 ml. of chlorobenzene was cooled in an ice bath and admixed with 1 ml. of ethylaluminum dichloride. The cold solution was the evacuated and pressured with propylene to 10 p.s.i.g. and maintained at that pressure. A total of 50 ml. (32 g.) of pentene-1 was then incrementally added in 10 ml. portions at 10 minute intervals. The reaction mixture was stirred at 0–5° C. under 10 p.s.i.g. of propylene pressure for another 2 hours.

The reaction mixture was then vented. A propylene absorption of 23.9 g. was noted. After washing with water, the separated organic phase was analyzed and found to contain 10.6 g. of $C_6$ olefins, 16.8 g. of $C_8$ olefins, and 10.9 g. of $C_{10}$ olefins. Thus codimerization of propylene and pentene-1 had taken place as well as homodimerization of each of these individual olefins.

EXAMPLE VII

Conversion of propylene over bis(triphenylphosphine)-dichloronickel and diethylaluminum chloride (DEAC)

Using the same general technique as that of Example I, propylene was contacted for 2 hours at 0–5° C. with a catalyst formed by the admixture of 0.65 g. of bis(triphenylphosphine)dichloronickel, 5 ml. of chlorobenzene and 1 ml. of diethylaluminum chloride. After 16 g. of propylene was absorbed and the distribution of products was very similar to that obtained in Example I.

EXAMPLE VIII

100 p.s.i.g. conversion of propylene

A 1-liter autoclave was charged with 0.65 g. of bis-(triphenylphosphine)dichloronickel, was sealed, and then cooled by means of circulating dry ice-acetone mixture. A solution of 9 ml. of chlorobenzene, 10 ml. of benzene, and 2 ml. of ethylaluminum dichloride was then added to the autoclave. At an initial temperature of −15° C., propylene was introduced into the reactor at 100 p.s.i.g. and maintained at that pressure for 1 hour. During that time, the temperature of the reaction mixture rose up to 51° C. and then fell back to −12° C.

After washing with water, the separated organic phase totaled 339 g. and analysis showed the presence of:

| Olefin | Wt. Percent | Grams |
| --- | --- | --- |
| $C_3$ | 0.7 | 2.4 |
| $C_6$ | 59.1 | 200.4 |
| $C_9$ | 15.6 | 52.8 |
| $C_{12}$ | 16.3 | 54.7 |
| Higher | 8.5 | 28.8 |

EXAMPLE IX

Conversion of ethylene

Using essentially the same technique as that described in Example VIII, ethylene at 500 p.s.i.g. was contacted with a catalyst formed by the admixture of 0.33 g. bis-(triphenylphosphine)dichloronickel, 90 ml. chlorobenzene, 10 ml. benzene, and 1 ml. ethylaluminum dichloride. The catalyst components were added to the reactor at −25° C. The initial ethylene introduction was carried out at an initial temperature of −35° C., but the temperature rose, during the 30 minute reaction period, to 70° C. before coming down to −20° C. at the completion of the period.

At the end of the reaction period, 10 ml. of isopropanol was added to destroy the catalyst. It was found that about 611 g. of ethylene had been absorbed, and analyses showed that about 500 g. (81.8 percent) of the products were $C_4$, about 101.5 g. (16.6 percent) of the products were $C_6$, and about 8.5 g. (1.4 percent) of the products were $C_8$ olefins. Additional analysis showed that, of the butenes, only about 0.1 percent were isobutenes, the major portion (about 80 percent) being trans-2-butene, the remainder being cis-2-butene with about 2 percent being butene-1.

EXAMPLE X

Low temperature conversion of ethylene

In the same general manner as that described in Example VIII, the autoclave was charged with 0.16 g. of bis(triphenylphosphine)dichloronickel. The reactor was cooled to −50° C. A solution of 45 ml. of chlorobenzene, 5 ml. of benzene, and 1 ml. of ethylaluminum dichloride was then added to the reactor. Ethylene was then admitted to the reactor at 500 p.s.i.g. in a 20 minute reaction period during which the temperature within the reactor was found to vary as follows:

| Time (minutes): | Degrees C |
| --- | --- |
| 0 | −50 |
| 3 | +62 |
| 8 | +10 |
| 11 | +1 |
| 20 | −26 |

After the reaction period, the reaction mixture was treated with 10 ml. of isopropanol to destroy the catalyst. Analysis showed that the following products were obtained: 546 g. (88.4 percent) butenes, 69 g. (11.4 percent) $C_6$ olefins, and 3.6 g. (0.6 percent) $C_8$ olefins.

EXAMPLE XI

Conversion of ethylene/propylene mixture

Using the same general procedure as that of Example VIII, a 3-necked flask, flushed with nitrogen, was charged with 100 ml. of chlorobenzene and 0.65 g. of bis(triphenylphosphine)dichloronickel. After cooling in an ice bath, 1 ml. of ethylaluminum dichloride was added. With continued ice bath cooling, ethylene and propylene were passed into the reaction mixture at the respective rates of 0.6 and 1.2 (through rotameters calibrated in SCFH air at STP).

After 1 hour and 20 minutes, the reaction was terminated, about 107 grams of gases being absorbed. Analysis showed the following distribution of products:

| Olefins: | Weight percent |
| --- | --- |
| $C_4$ | 4.5 |
| $C_5$ | 10.2 |
| $C_6$ | 48.6 |
| $C_7$ | 11.1 |
| $C_8$ | 8.3 |
| Higher | 17.2 |

Another test was carried out which is essentially identical to the test as described above except that the molar ratio of ethylene to propylene was 2:1 rather than the 1:2 of the previous test, and the temperature of reaction was maintained at about −25° C. instead of about 0° C.

The 3-necked flask was charged with 0.16 g. of bis-(triphenylphosphine)dichloronickel, 50 ml. of chlorobenzene, and 1 ml. of ethylaluminum dichloride. In a 2 hour reaction, ethylene and propylene were passed into the flask at the respective rates of 2.0 and 1.0 (as measured through rotameters calibrated in SCFH air at STP). After washing with water, the separated organic phase, which totaled about 254 grams of absorbed gases, was analyzed with the following results:

| Olefins: | Weight percent |
| --- | --- |
| $C_3$ | 4.0 |
| $C_4$ | 43.1 |
| $C_5$ | 25.6 |
| $C_6$ | 11.6 |
| $C_7$ | 6.3 |
| $C_8$ | 1.4 |
| Higher | 8.0 |

EXAMPLE XII

Preparation of bis(triphenylphosphine)allylnickel chloride

A suspension of 6.54 g. (0.01 mole) of bis(triphenylphosphine)dichloronickel in 50 ml. of tetrahydrofuran was admixed with 0.01 mole of allylmagnesium bromide (8.5 ml. ether solution). The mixture was then heated at reflux for 4 hours. The solvent was then removed under reduced pressure and a resulting bis(triphenylphosphine)-allylnickel chloride in the form of a dark green solid remained. 50 ml. of methylene chloride was then added to form a solution containing the bis(triphenylphosphine)-allylnickel chloride.

A 5.2 ml. quantity of the above prepared solution (1.0 millimole) was cooled in an ice bath and admixed with 1 ml. of ethylaluminum dichloride in a 7 ounce reaction bottle. The bottle was then evacuated and connected to a source of propylene at 25 p.s.i.g. while maintained in a 0–5° C. cooling bath. In a 2 hour reaction period, 85.5 g. of propylene was absorbed. Analysis showed the presence of 67.3 g. (79 percent) of propylene dimers.

EXAMPLE XIII

Conversion of propylene over bis(triphenylphosphine)-allylnickel chloride with EADC One millimole of a nickel complex in methylene chloride prepared in the above example was cooled in an ice bath and admixed with 1 ml. of ethylaluminum dichloride and then with propylene at 25 p.s.i.g. After 2 hours at 0–5° C., approximately 70 g. of propylene had been absorbed and the reaction mixture had separated into a clear orange-tan upper phase and a heavy dark catalyst-containing lower phase. The upper phase was decanted and the lower phase was treated with an additional 5 ml. of methylene chloride and 0.2 ml. of ethylaluminum dichloride, the additions being carried out under a nitrogen blanket. The reaction bottle, cooled in an ice bath, was charged with propylene at 25 p.s.i.g. In 2 hours at 0–5° C., 91 g. of propylene was absorbed. The separation of phases and the addition of 5 ml. of methylene chloride and 0.2 ml. of ethylaluminum dichloride was repeated. In the next 2 hour reaction period at 0–5° C., about 64 g. of propylene was absorbed.

The combined reaction products gave a total of 207 g. of propylene products. Analysis showed the presence of 154 g. (74 percent) of propylene dimers.

EXAMPLE XIV

Preparation of bis(triphenylphosphine)methylnickel chloride

A suspension of 6.54 g. (0.01 mols) of bis(triphenylphosphine)dichloronickel in 50 ml. of tetrahydrofuran was admixed with 0.01 mole of methylmagnesium bromide (a 3.33 ml. solution in ether) and heated at reflux for 3 hours. The tetrahydrofuran was removed under reduced pressure and 50 ml. of chlorobenzene added to make a dark green solution of bis(triphenylphosphine) methylnickel chloride.

One millimole of the above prepared complex was treated with 1 ml. of ethylaluminum dichloride, while cooling in an ice bath. Propylene was then introduced at 25 p.s.i.g. After a 2 hour reaction period at 0–5° C., 75.3 g. of propylene was absorbed. Analysis showed the presence of 62.2 g. (83 percent) of dimers.

EXAMPLE XV

Conversion of ethylene/cyclopentene mixture

Using the same general procedure as that of Example XI, the reactor was charged with 50 ml. of chlorobenzene, 0.33 g. of bis(triphenylphosphine)dichloronickel, and 0.5 ml. of ethylaluminum dichloride. This mixture was cooled to about $-20°$ C. However, before the ethylene was passed into the reactor it was first bubbled through a flask containing 57 g. of cyclopentene. In a 1 hour and 20 minute period, and while the reactor was maintained at $-20$ to $-25°$ C., the flow of ethylene transferred all of the cyclopentene into the reactor. The reaction mixture, at this point, was vented, treated with water, and the amount of organic material obtained indicated a total uptake of 171 g. of both ethylene and cyclopentene.

Analysis showed that 26.0 weight percent of the reaction mixture consisted of $C_7$ isomers of which 85.9 weight percent was found to be 1-ethylcyclopentene.

EXAMPLE XVI

Comparison of aluminum adjuvants

To compare the effectiveness of ethylaluminum dichloride, triethylaluminum, and aluminum trichloride, three propylene conversions were carried out simultaneously and under comparable conditions according to the general procedure of Example I. Equimolar amounts of bis(triphenylphosphine)dichloronickel and the specified aluminum adjuvant were charged to each 7 ounce reaction flask, together with an equal amount of chlorobenzene. All the reaction flasks were cooled in one ice bath and connected to the same p.s.i.g. propylene source in a 1 hour reaction period with comparable stirring. At the end of this period, the reactors were vented, the reaction mixtures hydrolyzed, and the recovered organic phases weighed and analyzed. The results of the analyses as well as the essential data of the tests are shown in the following table:

products which are principally dimers. The aluminum trichloride, like a great many other materials which show dimerization activity, produces a broad nonselective smear of polymeric products. Thus, the difference between ethylaluminum dichloride and aluminum trichloride is not only one of degree but also of kind.

EXAMPLES XVII–XIX

Several runs were carried out in which propylene was dimerized over catalyst systems of the invention which employed several different nickel halide complexes. The runs were carried out under a nitrogen atmosphere in previously dried equipment. The dimerizations were carried out for 2 hours at 0–5° C., in 7-ounce bottles which were equipped for stirring. The order of addition of the reagents was the nickel halide complex, the solvent, and then the organoaluminum halide compound. When the desired operating temperature was reached, the propylene was introduced at 25 p.s.i.g.

The organoaluminum halide adjuvant was, in every case, ethylaluminum dichloride in a ratio of 10 moles of the aluminum compound for each mole of the nickel halide complex. The essential data and results of these runs are shown in the table below.

DIMERIZATION OF PROPYLENE

| Complex, moles | Dimer, g. | Selectivity, percent |
|---|---|---|
| $(Ph_3PO)_2NiBr_2$ [1] | 21 | 55 |
| $(C_5H_5N)_2NiCl_2$ [2] | 25 | 49 |
| $(TED)_3Ni_2Cl_4$ [3] | 42 | 47 |

[1] Bis(triphenylphosphine oxide)dibromonickel.
[2] Bis(pyridine)dichloronickel.
[3] Complex formed from triethylenediamine and $NiCl_2$.

The data in the table above show that the catalyst system of the invention is capable of dimerizing propylene in substantial yields and with substantial selectivity. The dimers obtained were a mixture of olefins. Hydrogenation of a portion of the material from the pyridine complex-containing catalyst system gave a product containing 21 percent of n-hexane, 70 percent of 2-methylpentane, 2 percent of 3-methylpentane, and 7 percent of 2,3-dimethylbutane, while that of the triethylenediamine system containing the corresponding paraffins in yields of 13, 80, 0.3, and 6.5 percent, respectively.

Obviously, many modifications and variations of the present invention are possible in the light of the above teachings. It is therefore to be understood that within the scope of the appended claims the invention may be practiced otherwise than as specifically described herein.

That which is claimed is:

|  | Test A | Test B | Test C |
|---|---|---|---|
| Ethylaluminum dichloride | 1.2 g. (0.0095 mol) | | |
| Aluminum trichloride | | 1.3 g. (0.0095 mol) | |
| Triethylaluminum | | | 0.0095 mol.[1] |
| Bis(triphenylphosphine)-dichloronickel | 0.65 g. (0.001 mol) | 0.65 g. (0.001 mol) | 0.65 g. (0.001 mol). |
| Chlorobenzene | 5 ml | 5 ml | 5 ml. |
| Propylene uptake | 134.5 g | 36 g | 1 g. |
| Selectivity of $C_6$ olefins | 77% | 26% | Not analyzed. |

[1] As a 1.6 molar solution in cyclohexane.

These data show that ethylaluminum dichloride makes a catalyst system which is almost four times as active as the aluminum trichloride and makes products which are, principally dimers. The aluminum trichloride, on the other hand, produces a broad range of polymeric products of which a relatively small amount are dimers. The use of triethylaluminum gives extremely poor results which are obviously not at all comparable with the results obtained with ethylaluminum dichloride.

As can be seen from the above examples the incorporation of ethylaluminum dichloride as the second compound of the catalyst makes a catalyst which is almost four times as active as the aluminum trichloride and makes 1. A process for dimerizing a monomer system consisting essentially of monoolefins having from 2 to 12 carbon atoms comprising contacting at least one of said monoolefins with a catalyst formed by the admixture of a first component which is selected from the group consisting of those represented by the formula $(R_3P)_2NiY_2$,

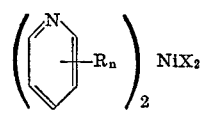

and a complex of

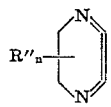

with $NiX_2$, where R is a hydrocarbon radical having up to about 20 carbon atoms, one Y is a halogen and one Y is a hydrocarbon radical as defined above, X is a halogen, $n$ is 0 to 4, and R'' is one of hydrogen, methyl, and ethyl, and a second component represented by the formula $R'_xAlX_y$ where $x$ and $y$ are integers of at least 1 whose total is 3, R' is a hydrocarbon radical having up to about 20 carbon atoms and X is a halogen.

2. A process according to claim 1 wherein said R of said first and second component is selected from the group consisting of an alkyl, alkenyl, aryl, cycloalkyl and combinations thereof, Y and X of said first component are selected from the group consisting of chlorine, bromine, iodine, and a hydrocarbon radical as further defined above, and $n$ is 0.

3. A process according to claim 1 wherein said first and second component of said catalyst are present in a proportion in the range of from about 0.5:1 to about 20:1 moles of said second component per mole of said first component, and said first and second components of said catalyst are admixed at a temperature within the range of from about −80 to about 100° C., preferably within the range of from about −20 to about 50° C., at a pressure up to about 2000 p.s.i.g., preferably 20–500 p.s.i.g., for from about 5 seconds to about 3 hours.

4. A process according to claim 1 wherein said first and second components of said catalyst are admixed in a halogenated hydrocarbon diluent selected from the group consisting of chlorobenzene, methylene chloride, and ethylene chloride.

5. A process according to claim 1 wherein said first component is selected from the group consisting of bis(triphenylphosphine)allylnickel chloride, bis(triphenylphosphine)methylnickel chloride, bis(triphenylphosphine oxide)dibromonickel, bis(pyridine)dichloronickel, and a complex of triethylenediamine and dichloronickel.

6. A process according to claim 5 wherein said second component is one of ethylaluminum dichloride and diethylaluminum chloride.

7. A dimerization catalyst formed by admixing a first component selected from the group represented by the formulae $(R_3P)_2NiY_2$, $(R_3PO)_2NiX_2$,

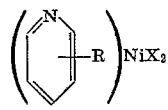

and a complex of

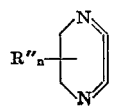

with $NiX_2$, where R is a hydrocarbon radical having up to about 20 carbon atoms, one Y is a halogen and one Y is a hydrocarbon radical as defined above, X is a halogen, $n$ is 0 to 4 and R'' is one of hydrogen, methyl, and ethyl, and a second component represented by the formula $R'_xAlX_y$ where $x$ and $y$ are integers of at least 1 whose total is 3, R' is a hydrocarbon radical having up to about 20 carbon atoms, and X is a halogen, said first and second component of said catalyst being present in a proportion in the range of about 0.5:1 to about 20:1 moles of said second component per mole of said first component.

8. A dimerization catalyst accordnig to claim 7 wherein said first component is selected from the group consisting of bis(triphenylphosphine)allylnickel chloride, bis(triphenylphosphine)methylnickel chloride, bis(triphenylphosphine oxide)dibromonickel, bis(pyridine)dichloronickel, and a complex of triethylenediamine and dichloronickel.

9. A process according to claim 7 wherein said second component is one of ethylaluminum dichloride and diethylaluminum chloride.

References Cited

UNITED STATES PATENTS

| | | | |
|---|---|---|---|
| 3,306,948 | 2/1967 | Kealy | 260—680 |
| 3,165,557 | 1/1965 | Coover. | |
| 3,159,689 | 12/1964 | Ziegler. | |
| 3,354,235 | 11/1967 | Hogan. | |
| 3,008,943 | 11/1961 | Guger | 260—937 |
| 3,238,265 | 3/1966 | Mueller | 260—666 |
| 3,364,273 | 1/1968 | Clark et al. | |
| 3,235,613 | 2/1966 | Lapporte. | |
| 2,991,317 | 7/1961 | Sellers. | |
| 3,149,173 | 9/1964 | Wittenberg. | |
| 3,249,641 | 5/1966 | Storrs. | |
| 3,321,546 | 5/1967 | Roest. | |
| 3,355,510 | 11/1967 | Cannell. | |
| 3,271,468 | 9/1966 | Wilke. | |
| 3,272,876 | 9/1966 | Levine. | |
| 3,349,138 | 10/1967 | Larson. | |
| 3,382,292 | 5/1968 | Endler. | |
| 3,379,706 | 4/1968 | Wilke | 260—94.3 |
| 3,422,128 | 1/1969 | Wilke | 260—439 |
| 3,424,778 | 1/1969 | Wilke | 260—439 |
| 3,420,904 | 1/1969 | Hellwig | 260—666 |
| 3,399,182 | 8/1968 | Farkas. | |
| 3,427,365 | 2/1969 | Maxfield. | |

OTHER REFERENCES

W. R. McClellan et al., J. Amer. Chem. Soc., 83, pp. 1601–1607, 1961.

DELBERT E. GANTZ, Primary Examiner

V. O'KEEFE, Assistant Examiner

U.S. Cl. X.R.

252—429; 260—439, 680, 683.15